(12) United States Patent
Lai et al.

(10) Patent No.: US 10,662,304 B2
(45) Date of Patent: May 26, 2020

(54) COMPOSITES FOR PROTECTING SIGNAL TRANSMITTERS/RECEIVERS

(71) Applicant: SAINT-GOBAIN PERFORMANCE PLASTICS CORPORATION, Solon, OH (US)

(72) Inventors: Choung Lai, Acton, MA (US); Ajay Padwal, Merrimack, NH (US); Marie J. Demers, Dover, NH (US); David W. Stresing, Kent, OH (US); John E. Langlois, Quinebaug, CT (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 214 days.

(21) Appl. No.: 14/588,080

(22) Filed: Dec. 31, 2014

(65) Prior Publication Data

US 2016/0297941 A1    Oct. 13, 2016

Related U.S. Application Data

(60) Provisional application No. 61/922,609, filed on Dec. 31, 2013.

(51) Int. Cl.
   *C08J 5/24*      (2006.01)
   *H01Q 1/42*      (2006.01)
   (Continued)

(52) U.S. Cl.
   CPC ............... *C08J 5/24* (2013.01); *B64C 1/36* (2013.01); *H01Q 1/422* (2013.01);
   (Continued)

(58) Field of Classification Search
   CPC ....................................................... C08J 5/24
   See application file for complete search history.

(56) References Cited

U.S. PATENT DOCUMENTS

| | | | |
|---|---|---|---|
| 4,224,541 | A | 9/1980 | Smith et al. |
| 4,581,293 | A | 4/1986 | Saunders |

(Continued)

FOREIGN PATENT DOCUMENTS

| | | | |
|---|---|---|---|
| CA | 2045708 A1 | 12/1991 | |
| CA | 2362609 A1 | 8/2000 | |

(Continued)

OTHER PUBLICATIONS

The International Search Report and the Written Opinion received from the International Searching Authority (ISA/KR) for International Application No. PCT/US2014/073069 dated Mar. 30, 2015, 14 pages.

*Primary Examiner* — Megan McCulley
(74) *Attorney, Agent, or Firm* — Abel Schillinger, LLP; Chi Suk Kim

(57) ABSTRACT

Embodiments of the present disclosure are directed to a composition and composite for protecting a transmission/reception device. The composite can include a reinforcing material and a cured epoxy composition impregnating the reinforcing material. The cured epoxy composition can contain reaction constituents including less than 50% stoichiometric amount of an anhydride curing agent to an epoxy resin. The composite can exhibit synergistic improvements in mechanical strength, weatherability, and signal transmission properties.

17 Claims, 5 Drawing Sheets

(51) Int. Cl.
  *B64C 1/36* (2006.01)
  *B64C 1/00* (2006.01)
(52) U.S. Cl.
  CPC ... *B64C 2001/0072* (2013.01); *C08J 2363/00* (2013.01); *C08J 2471/02* (2013.01)

(56) References Cited

U.S. PATENT DOCUMENTS

| | | | |
|---|---|---|---|
| 4,923,908 | A | 5/1990 | Lostumo et al. |
| 5,027,130 | A | 6/1991 | Akaba et al. |
| 5,439,746 | A | 8/1995 | Suzuki |
| 5,502,098 | A | 3/1996 | Watanabe et al. |
| 6,225,378 | B1 | 5/2001 | Wang et al. |
| 6,703,124 | B2 | 3/2004 | Kim et al. |
| 7,420,423 | B2 | 9/2008 | Ziolkowski et al. |
| 8,221,870 | B2 | 7/2012 | Brown |
| 8,404,310 | B2 | 3/2013 | Rousse et al. |
| 2002/0131247 | A1 | 9/2002 | Cooray |
| 2002/0161117 | A1* | 10/2002 | Yin ............... C08G 65/485 525/107 |
| 2003/0211303 | A1 | 11/2003 | Lane et al. |
| 2003/0215623 | A1 | 11/2003 | Lane et al. |
| 2004/0266899 | A1 | 12/2004 | Muenz et al. |
| 2006/0182949 | A1 | 8/2006 | Salnikov et al. |
| 2007/0129502 | A1 | 6/2007 | Kawabe et al. |
| 2008/0139722 | A1* | 6/2008 | Shefelbine ............ B82Y 30/00 524/413 |
| 2008/0218416 | A1 | 9/2008 | Handy et al. |
| 2009/0018303 | A1* | 1/2009 | Onizuka ............ C08G 59/621 528/88 |
| 2010/0048826 | A1 | 2/2010 | Ishii et al. |
| 2010/0314160 | A1 | 12/2010 | Chang et al. |
| 2011/0048776 | A1 | 3/2011 | Qiang et al. |
| 2011/0214852 | A1 | 9/2011 | Wang et al. |
| 2011/0224332 | A1 | 9/2011 | He et al. |
| 2011/0257299 | A1 | 10/2011 | Aoyama et al. |
| 2011/0275739 | A1 | 11/2011 | Ogura et al. |
| 2012/0006588 | A1* | 1/2012 | Kakiuchi ............ B32B 27/38 174/258 |
| 2012/0083564 | A1 | 4/2012 | Storer et al. |
| 2012/0129414 | A1 | 5/2012 | Chang et al. |
| 2012/0289624 | A1 | 11/2012 | Metral et al. |
| 2013/0011682 | A1 | 1/2013 | Wu |
| 2013/0062045 | A1 | 3/2013 | Chu et al. |
| 2013/0190445 | A1 | 7/2013 | Gan |

FOREIGN PATENT DOCUMENTS

| | | |
|---|---|---|
| CN | 101364669 A | 2/2009 |
| CN | 101775195 A | 7/2010 |
| CN | 102051022 A | 5/2011 |
| CN | 102181143 A | 9/2011 |
| DE | 4422652 A1 | 1/1995 |
| EP | 1489079 A1 | 12/2004 |
| GB | 2200357 A | 8/1988 |
| JP | 2001031659 A | 2/2001 |
| JP | 2002167427 A | 6/2002 |
| JP | 2007224283 A | 9/2007 |
| JP | 2011202135 A | 10/2011 |
| JP | 2011236428 A | 11/2011 |
| JP | 2012111807 A | 6/2012 |
| KR | 20020044342 A | 6/2002 |
| KR | 20020085475 A | 11/2002 |
| KR | 100835785 B1 | 6/2008 |
| KR | 20120025277 A | 3/2012 |
| WO | 9831750 | 7/1998 |
| WO | 9915331 | 4/1999 |
| WO | 0047655 | 8/2000 |
| WO | 0202666 A1 | 1/2002 |
| WO | 2008140906 A1 | 11/2008 |
| WO | 2011068644 A1 | 6/2011 |

* cited by examiner

COMPOSITES FOR PROTECTING SIGNAL TRANSMITTERS/RECEIVERS

CROSS-REFERENCE TO RELATED APPLICATION(S)

This application claims priority under 35 U.S.C. § 119(e) to U.S. Provisional Patent Application No. 61/922,609 entitled "COMPOSITES FOR PROTECTING SIGNAL THRANSMITTERS/RECEIVERS," by Choung Lai et al., filed Dec. 31, 2013. Each patent application cited herein is hereby incorporated by reference in its entirety.

FIELD OF THE DISCLOSURE

The present disclosure relates to composites for protecting signal transmitters/receivers and more particularly to such composites having fiber reinforced epoxy layers.

RELATED ART

Protective covers a are designed to transmit and/or receive signals such as radio signals are used in a wide variety of industries. The protective covers are often exposed to high stresses, particularly when employed as a nose cone of an airplane. The covers must also, in many circumstances, be capable of withstanding the effects of harsh environmental conditions (sun, heavy rain, ice, blowing sand, temperature extremes, high winds, etc.). Typically, such protective covers are used to cover weather radar antennas, air surveillance radar antennas, satellite communication antennas, and other antenna.

Particularly when weight is a concern, such as in a nose cone of an airplane, protective covers can be composed of a fiber reinforced epoxy based composite. However, known types of such composites have drawbacks when used to protect devices adapted to transmit and/or receive signals. For example, the industry demands composites having improved characteristics such as dielectric constant, dielectric loss tangent, water absorption, and the like.

Known epoxy systems rely on curing agents which can negatively affect certain properties essential in a composite protecting a device adapted to transmit and/or receive radio signals, such as the dielectric constant. Accordingly, a need exists to develop novel protective composites which reduce the amount of curing agent and improve the dielectric constant while still achieving full cure.

The present disclosure addresses these and other deficiencies and describes a protective cover exhibiting synergistically improved properties including dielectric constant, dielectric loss tangent, water absorption and/or others.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the protective composite arts.

Figure 1:
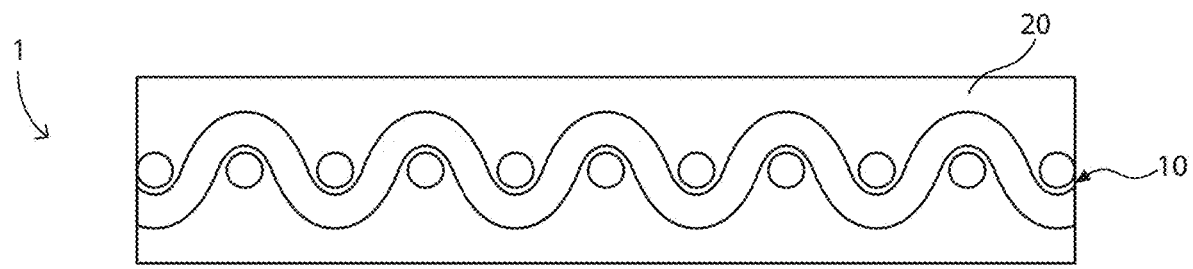
FIG. 1 includes a cross section illustration of a composite according to one embodiment of the present disclosure.

The present disclosure is directed to composites, protective covers, and nose cones for airplanes having a cured epoxy composition having significantly improved, synergistic performance of properties such as dielectric constant, water absorption, dielectric loss tangent, and others. Further embodiments are directed to such epoxy compositions. The concepts are better understood in view of the embodiments described below that illustrate and do not limit the scope of the present invention Referring now to FIG. 1, a composite 1 for protecting a transmission/reception device can include a reinforcing material 10 and a cured epoxy composition 20 impregnating the reinforcing material 10. In certain embodiments, the cured epoxy composition 20 can completely cover the reinforcement material 10, as well as being impregnated into the reinforcing material 10.

Figure 2:
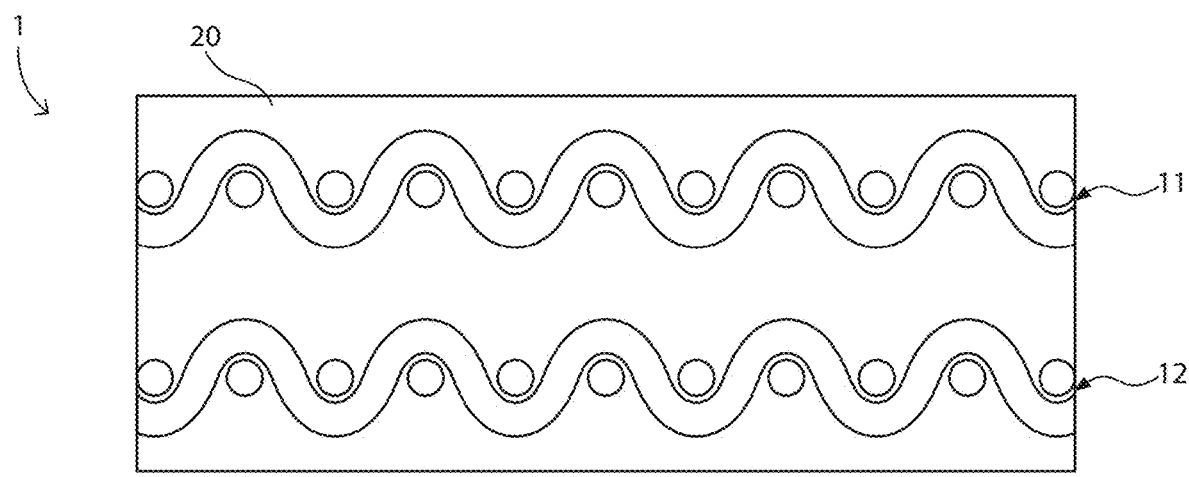
FIG. 2 includes a cross section illustration of a composite according to one embodiment of the present disclosure.

Referring to FIG. 2, the composite 1 can contain more than one layer or plies of reinforcing material. For example, as illustrated in FIG. 2, the composite can contain a first reinforcing material 11 and a second reinforcing material 12 disposed over the first reinforcing material 11. It is to be understood that any number of reinforcing materials can be included in a composite described herein.

In particular embodiments, the composite can contain at least 3, at least 4, at least 5, or even at least 6 independent and distinct layers of reinforcing material. In further embodiments, the composite can contain no greater than 30, no greater than 20, or even no greater than 15 independent layers of reinforcing material.

In certain embodiments, the composite structure can be formed by impregnating a reinforcing material with an uncured epoxy composition. The method of particular formation of the composite structure is not limited in various embodiments. However, in particular embodiments, the uncured epoxy composition can be coated onto a liner. Then, the reinforcing material can be placed on the spread epoxy composition. Further, the reinforcing material can be coated with a second layer of epoxy composition. The layered structure can then be compressed to impregnate the epoxy composition within the reinforcing material. In other embodiments, the reinforcing material can be impregnated with an uncured epoxy composition by immersing in through a reservoir containing the uncured epoxy composition. Further details of examples of suitable composite formation techniques in particular embodiments can be found in U.S. Pat. No. 6,787,237, which is incorporated herein by reference for all useful purposes.

As described above, in particular embodiments, multiple layers of reinforcing material can be included in the composite structure. For such composite containing multiple layers of reinforcing material, a second reinforcing material can be placed over the composite described above, and a layer of the epoxy composition can be added, and the entire structure compressed to impregnate the second reinforcement material and coalesce the composite. This process can be repeated for each additional layer of reinforcing material to be added to the composite.

The reinforcing material can include any number of different materials. In particular embodiments, the reinforcing material can contain fibers. In certain embodiments, the reinforcing material can be in the form of a fabric. The fabric can be woven, non-woven, spunbond, meltspun, or combinations thereof. In particular embodiments, the fabric can be a woven fabric.

The woven fabric could be formed by any number of conventional weaving or knitting procedures. The fabric could also be formed by any other procedure that can create a material with one set of yarns at an angle to another set of yarns. Some yarns that may be used include fiberglass, nylon, polyester, aramid (such as KEVLAR® or NOMEX® available from Dupont), polyethylene, polyolefins, polyimides, quartz, carbon, polybenzimidazole (PBI), polybenzoxazole (PBO), fluorocarbon, or combinations thereof. Further, other materials may be used to form the yarns of a woven fabric. A yarn may be formed from one of these materials or may comprise a combination of these materials (potentially twisted together). When the composite contains multiple layers of reinforcement material, any combination of the above recited reinforcement materials may be used. For example, in particular embodiments the composite can contain multiple layers of essentially the same reinforcement material. In other embodiments, the composite can contain multiple layers of different reinforcement materials.

As discussed above, the composite can further include a cured epoxy based material impregnating and disposed between layers of reinforcement material. In particular embodiments, the epoxy based material can be obtained by mixing and reacting various constituents. For example, the constituents can include an epoxy resin, a polyphenylene ether polymer or copolymer, a curing agent, a catalyst; and other optional additives such as a reactive phosphorus containing compound, a toughening agent, hollow glass spheres, and other desired or common additives.

In certain embodiments, the cured epoxy composition can contain an advantageous type of crosslinkage, i.e. particular type of crosslinking bonds. For example, in particular embodiments, the cured epoxy composition can contain ether crosslinkage, ester crosslinkage, or combinations thereof. In even further particular embodiments, the cured epoxy composition can contain a significant amount of ether crosslinkage, and in further particular embodiments can contain a majority of ether crosslinkage, based on the total amount of ether crosslinkage. The type and amount of that type of crosslinkage can be determined by FTIR or NMR analysis as is understood in the art and discussed in further detail herein.

In certain embodiments, the cured epoxy composition can contain ether crosslinkage. In particular embodiments, the cured epoxy composition can contain at least 30%, at least 40%, at least 50%, at least 60%, or even at least 70% ether crosslinkage, based on the total amount of crosslinkage. Further, in certain embodiments, the cured epoxy composition can contain no greater than 100%, no greater than 99%, no greater than 95%, or even no greater than 90% ether crosslinkage based on the total amount of crosslinkage. Moreover, in certain embodiments, the cured epoxy composition can contain an amount of ether crosslinkage in a range of any of the minimum or maximum percent ether crosslinkages provided above, such as in a range of 30% to 100%, 50% to 99%, or even 60% to 95%, based on the total amount of crosslinkage.

In certain embodiments, the cured epoxy composition can contain ester crosslinkage. For example, in certain embodiments, the cured epoxy composition can contain at least 1%, at least 5%, at least 8%, at least 10%, or even at least 15% ester crosslinkage, based on the total amount of crosslinkage. Further, in certain embodiments, the cured epoxy composition can contain no greater than 75%, no greater than 50%, no greater than 40%, or even no greater than 30% ester crosslinkage based on the total amount of crosslinkage. Moreover, in certain embodiments, the cured epoxy composition can contain an amount of ester crosslinkage in a range of any of the minimum or maximum percent ether crosslinkages provided above, such as in a range of 1% to 75%, 5% to 50%, or even 10% to 40%, based on the total amount of crosslinkage.

In particular embodiments, the cured epoxy composition can contain both ether and ester crosslinkage, such as in any combination of the amounts described above.

A particular advantage of certain embodiments of the present disclosure is having a composite material containing a cured epoxy resin having ether and/or ester crosslinkage, particularly a significant amount of ether crosslinkage. In such embodiments, the current inventors surprisingly discovered that unparalleled crosslinking density can also be achieved. Moreover, in certain embodiments, by having the recited types and amounts of crosslinkage, the current inventors unexpectedly discovered significant, synergistic, benefits in performance properties such as dielectric constant, water absorption, and dielectric loss tangent, as demonstrated by the Examples below.

In further embodiments, the cured epoxy composition can contain little to no amine crosslinkage. For example, the cured epoxy composition can contain no greater than 10%, no greater than 5%, no greater than 3%, no greater than 2%, no greater than 1%, or even essentially free of amine crosslinkage.

In further embodiments, the cured epoxy composition can contain little to no hydroxyl crosslinkage. For example, the cured epoxy composition can contain no greater than 10%, no greater than 5%, no greater than 3%, no greater than 2%, no greater than 1%, or even essentially free of hydroxyl crosslinkage.

In certain embodiments, the epoxy composition can contain an epoxy resin. In certain embodiments, any useful type of epoxy resin can be included, and the particular type of epoxy resin is not limited.

In particular embodiments, the epoxy resin can include a bisphenol A epoxy resin, a bisphenol F epoxy resin, bisphenol Z type epoxy, biphenol epoxy, tetramethylbiphenol epoxy, hesamethylbiphenol epoxy, xylene novolak epoxy, biphenyl novolak epoxy, cresol novolak epoxy, and flame-retardant epoxy resins obtained by brominating these epoxy resins, an alicyclic epoxy resin, a biphenyl epoxy resin, or halogenated version of the above resins such as a halogenated bisphenol A epoxy resin or a halogenated bisphenol F epoxy resin, or combinations thereof. Specific non limiting examples of certain epoxy resins in particular embodiments can include, a diglycidylether of bisphenol-a, diglycidyl ethers of bisphenol F or halogenated or brominated versions or combinations thereof.

In particular embodiments, the epoxy resin can be compatible or curable with an anhydride curing agent. In further embodiments, the epoxy resin can be compatible with an imidazole compound, a substituted guanidine compound, such as dicyandiamide, or combinations thereof.

In certain embodiments, the epoxy resin can be present in the uncured epoxy composition in an amount of at least 40 wt. %, at least 50 wt. %, or even at least 60 wt. %, based on the total weight of the uncured epoxy composition. Further, in certain embodiments, the epoxy resin can be present in the uncured epoxy composition in an amount of no greater than 90 wt. %, no greater than 80 wt. %, or even no greater than 75 wt. %, based on the total weight of the uncured epoxy composition. Moreover, in certain embodiments, the epoxy resin can be present in the uncured epoxy composition in an amount within a range of any of the minimum and maximum values provided above, for example, in a range of 40 wt. % to 90 wt. %, 50 wt. %, to 80 wt. %, or even 60 wt. % to 75 wt. %, based on the total weight of the epoxy composition.

In certain embodiments, the epoxy composition can further include a phenyl ether polymer or copolymer, such as a polyphenylene oxide based material, a polyphenyl ether based material, or combinations thereof. In particular embodiments, the epoxy composition can include a polyphenylene oxide polymer or copolymer. In further particular embodiments, the epoxy composition can include a polyphenyl ether polymer or copolymer.

Particular, non-limiting examples of suitable polyphenylene oxides can include those with epoxide terminal groups, such as disclosed in U.S. Pat. No. 7,276,563, which is incorporated herein by reference for all useful purposes.

In further embodiments, the phenyl ether polymer can include hydroxyl functionality and/or epoxide functionality, and in particular embodiments a low hydroxyl functionality. For example, the polyphenylene oxide based material can have a hydroxyl equivalent weight (HEW) of no greater 5,000 g/mol, no greater than 4,000 g/mol, or even no greater than 3,000 g/mol. In certain embodiments the phenyl ether polymer can have a hydroxyl equivalent weight (HEW) of at least 500 g/mol, at least 600 g/mol, at least 700 g/mol, or even at least 800 g/mol. In further embodiments, the phenyl ether polymer or copolymer can have a hydroxyl equivalent weight (HEW) in a range of any of the minimums and maximums provided above, such as in a range of from 500 to 5,000 gm/mol.

In further embodiments, the polyphenylene ether or polyphenylene ether copolymer can have a number average molecular weight of no greater than 50,000, no greater than 40,000, no greater than 30,000, no greater than 20,000, no greater than 15,000, no greater than 13,000, no greater than 12,000, no greater than 11,000, no greater than 10,000, no greater than 9,000, no greater than 8,000, no greater than 7,000, no greater than 6,000, or even no greater than 5,000. In further embodiments, the polyphenylene ether or polyphenylene ether copolymer can have a number average molecular weight of at least 300, at least 500, or even at least 800. Moreover, the polyphenylene ether or polyphenylene ether copolymer can have a number average molecular weight in a range of any of the minimums and maximums provided above, such as in a range of 300 to 15,000, 500 to 13,000, or even 800 to 10,000.

In particular embodiments, the polyphenylene ether or polyphenylene ether can contain a terminal group which can be reactive with the epoxy resin. In other embodiments, the polyphenylene ether or polyphenylene ether can contain a terminal group which can be non-reactive with the epoxy resin.

In particular embodiments, the epoxy composition can include a blend of a polyphenylene oxide or polyphenyl ether and a styrenic compound, such as polystyrene. Particular polyphenyl ether compounds can include poly (arylene ether) based compounds. For example, one such category of poly(arylene ether) based compound can be found in WO 2008033611 A1, which is incorporated herein by reference. A particularly suitable example of a commercial available polyphenyl ether compound in particular embodiments is a compound offered for sale by Sabic Corporation under the trade name Noryl SA90, shown below, which is described in U.S. patent application Ser. No. 11/532,135 filed Sep. 15, 2006.

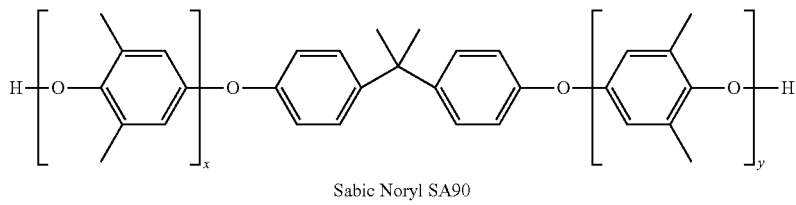

Sabic Noryl SA90

In certain embodiments, the phenyl ether polymer can be present in the uncured epoxy composition in an amount of at least 0.1 wt. %, at least 1 wt. %, or even at least 3 wt. %, based on the total weight of the epoxy composition. Further, in certain embodiments, the phenyl ether polymer can be present in the uncured epoxy composition in an amount of no greater than 50 wt. %, no greater than 42 wt. %, or even no greater than 35 wt. %, based on the total weight of the epoxy composition. Moreover, in certain embodiments, the phenyl ether polymer can be present in the uncured epoxy composition within a range of any of the minimum and maximum values provided above, such as in a range of 0.1 wt. % to 50 wt. %, 1 wt. % to 42 wt. %, or even 3 wt. % to 35 wt. %, based on the total weight of the epoxy composition.

In certain embodiments, the uncured epoxy composition can contain a curing agent. In particular embodiments, the uncured epoxy composition can contain an anhydride curing agent, substituted guanidine curing agent, or a combination thereof.

In very particular embodiments, the anhydride curing agent can include, for example maleic anhydride, Nadic methyl anhydride, hexahydrophthalic anhydride, trimellitic anhydride, dodecenyl succinic anhydride, phthalic anhydride, methyl hexahydrophthalic anhydride, tetrahydrophthalic anhydride, methyl tetrahydrophthalic anhydride, or combinations thereof. Specific examples of certain anhydrides can include, tetrahydro-4-methylphthalic anhydride, methyl-4-endomethylene tetrahydrophtalic anhydride, or combinations thereof.

In other particular embodiments, the curing agent can include a substituted guanidine compound. For example, specific substituted guanidine compounds can include methyl-guanidine, dimethylguanidine, trimethylguanidine, tetra-methylguanidine, methylisobiguanidine, dimethylisobiguanidine, tetramethyliso-biguanidine, hexamethylisobiguanidine, heptamethylisobiguani-dine, cyanoguanidine (dicyandiamide), and combinations thereof. In particular embodiments, the curing agent can include cyanoguanidine (dicyandiamide).

In particular embodiments, the curing agent can be present in the epoxy composition in an amount of at least 0.01 wt. %, at least 1 wt. %, at least 5 wt. %, at least 7 wt. %, or even at least 10 wt. %, based on the total weight of the epoxy composition. In further embodiments, the curing agent can be present in the epoxy composition in an amount of no greater than 50 wt. %, no greater than 45 wt. %, or even no greater than 40 wt. %, based on the total weight of the epoxy composition. Moreover, in certain embodiments, the curing agent can be present in the epoxy composition within a range of any of the minimum and maximum values provided above, such as in a range of 0.01 wt. % to 50 wt. %, 1 wt. % to 50 wt. %, or even 7 wt. % to 50 wt. %, based on the total weight of the epoxy composition.

In particular embodiments, the curing agent can be present in the epoxy composition in less than a stoichiometric amount based on the epoxy resin. It is to be understood that the stoichiometric amount of a curing agent that is theoretically needed to cure the epoxy composition is dependent on the particular reaction constituents used.

In certain embodiments, the curing agent can be present in the epoxy composition in less than 10%, less than 20%, less than 30%, less than 40%, less than 50%, less than 60%, or even less than 70% of the stoichiometric amount based on the epoxy resin. In further embodiments, the curing agent can be present in the epoxy composition in at least 1%, even at least 5%, of the stoichiometric amount based on the epoxy resin. Moreover, the curing agent can be present in the epoxy composition within a range of any of the minimum or maximum percentages of stoichiometric amounts based on the epoxy resin as illustrated above, for example, in a range of from 1% to 50% or even from 5% to 40% of a stoichiometric amount based on the epoxy resin.

In certain embodiments, the epoxy composition can further include a catalyst suitable to catalyze the curing reaction of the epoxy resin and curing agent. In particular embodiments, the catalyst can include a catalyst adapted to promote ether crosslinkage as the primary crosslink pathway. In still even further particular embodiments, the catalyst can include a catalyst adapted to promote ester crosslinkage as the secondary crosslink pathway. In particular embodiments, the catalyst can include an imidazole based compound, a boron halide compound or complex such as boron trichloride, boron trifluoride, boron trichloride amine complex, or combinations thereof. Examples of suitable imidazole based catalysts in certain embodiments can include compounds having one imidazole ring per molecule, such as imidazole, 2-methylimidazole, 2-ethyl-4-methylimidazole, 2-methyl-4-ethyl imidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-methylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)]-ethyl-s-triazine, 2,4-diamino-6-[2'-ethyl-4-methylimidazolyl-(1)]-ethyl-s-triazine, 2,4-diamino-6-[2'-undecylimidazolyl-(1)']-ethyl-s-triazine, 2-methyl-imidazo-lium-isocyanuric acid adduct, 2-phenylimidazolium-isocyanuric acid adduct, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole and the like; and compounds containing 2 or more imidazole rings per molecule which are obtained by dehydrating above-named hydroxymethyl-containing imidazole compounds such as 2-phenyl-4,5-dihydroxymethylimidazole, 2-phenyl-4-methyl-5-hydroxymethylimidazole and 2-phenyl-4-benzyl-5-hydroxymethylimidazole; and condensing them with formaldehyde, e.g., 4,4'-methylene-bis-(2-ethyl-5-methylimidazole), and the like. Very specific, nonlimiting examples, of imidazole based compounds include 2-alkyl imidazoles which could also be substituted in the 4-position, such as 2-Ethyl-4-methylimidazole, or other imidazoles such as 2,4 diamino-6(2'-methylimidazoleyl-(1')) ethyl-s-triazine, or combinations thereof. Moreover, specific examples of commercially available imidazole based compounds can include Imicure AMI-2; Curezol™ 2EMZ; Curezol™ 1B2MZ; Curezol™ 2PZ; Curezol™ 2P4MZ; Curezol™ C17Z; Curezol™ 2MZ Azine; Curezol™ 2PHZ-S; Curezol™ 2MA-OK; Imicure™ HAPI; or combinations thereof, which are obtainable from Air Products; or Accelerator™ DY 070, Aradur™ 3123 which are obtainable from Huntsman.

In certain embodiments, the catalyst can be present in the epoxy composition in an amount of at least 0.01 wt. %, at least 0.05 wt. %, or even at least 0.2 wt. %, based on the total weight of the epoxy composition. In further embodiments, the catalyst can be present in the epoxy composition in an amount of no greater than 25 wt. %, no greater than 20 wt. %, or even no greater than 15 wt. %, based on the total weight of the epoxy composition. Moreover, in certain embodiments, catalyst can be present in the epoxy composition within a range of any of the minimum and maximum values provided above, such as in a range of 0.01 wt. % to 25 wt. %, 0.05 wt. % to 20 wt. %, or even 0.2 wt. % to 15 wt. %, based on the total weight of the epoxy composition.

As discussed above, in particular embodiments, the catalyst can include a catalyst adapted to promote ether crosslinkage. In certain embodiments, the catalyst can be of a type and present in an amount to achieve desired levels of ether crosslinkage as described above. It is to be understood that the promotion of ether crosslinkage can also depend on other components, such as the type and amount of curing agent used. In certain embodiments, it can be useful to describe a minimal amount of catalyst that is adapted to promote ether crosslinkage based on the amount of epoxy present in the composition. Accordingly, in certain embodiments, an epoxy composition can contain an epoxy resin and a catalyst adapted to promote ether/ester crosslinkage, and the epoxy composition can contain at least 0.001, at least 0.005, at least 0.01, at least 0.015, at least 0.018, at least 0.020, or even at least 0.025 mole of catalyst adapted to promote ether crosslinkage per epoxy equivalent mole, when fully reacted. Moreover, in certain embodiments, an epoxy composition can contain an epoxy resin and a catalyst adapted to promote ether crosslinkage, and the epoxy composition can contain no greater than 0.5, no greater than 0.4, no greater than 0.3, no greater than 0.2, no greater than 0.18, no greater than 0.16, no greater than 0.14, or even no greater than 0.12 mole of catalyst adapted to promote ether crosslinkage per epoxy equivalent mole, when fully reacted. Still further, in certain embodiments, an epoxy composition can contain an epoxy resin and a catalyst adapted to promote ether crosslinkage, and the epoxy composition can contain a molar amount of catalyst adapted to promote ether/ester crosslinkage per epoxy equivalent mole when fully reacted within a range of any of the minimum and maximum values above, such as in a range of 0.005 to 0.3, or even 0.02 to 0.12 mole of catalyst adapted to promote ether crosslinkage per epoxy equivalent mole, when fully reacted. It is to be understood that the particular ratio of catalyst to epoxy can depend on the specific materials used. In very particular embodiments, the catalyst adapted to promote ether crosslinkage can include an imidazole based compound, and in even further particular embodiments, the epoxy composition can further contain less than a stoichiometric amount of anhydride curing agent to epoxy resin to promote ester crosslinkage.

In particular embodiments, the epoxy composition can be described by characterized by Attenuated Total Reflectance FTIR spectroscopy (ATR-FITR) to determine a peak height ratios of OH groups to aromatic CH groups. Attenuated Total Reflectance (ATR)-FTIR spectroscopy is a widely recognized technique for characterizing the structure of polymeric materials. For example, traditional epoxy resins for protecting signal transmitters/receivers cave a relatively high OH to aromatic CH peak height ratios measured under ATR-FITR, such as about 1.59 and greater. In contrast, the current inventors have developed an epoxy composition which can have a lower OH to aromatic CH peak height ratios measured under ATR-FITR. For example, in particular embodiments, the epoxy resin can have a OH to aromatic CH peak height ratios measured under ATR-FITR of no greater than 1.58, no greater than 1.5, no greater than 1.4, no greater than 1.3, no greater than 1.2, no greater than 1.1, or even no greater than 1.0. In further embodiments, the epoxy resin can have a OH to aromatic CH peak height ratios measured under ATR-FITR of at least 0.1, at least 0.2, or even at least 0.3. Moreover, in particular embodiments, the epoxy resin can have a OH to aromatic CH peak height ratio measured under ATR-FITR in a range of any of the minimums and maximums provided above, such as in a range of from 0.1 to 1.59, 0.1 to 1.5, 0.2 to 1.4, or even 0.3 to 1.3.

Without wishing to be bound by theory, it is believed that the lower OH to aromatic CH peak height ratio can contribute to improved characteristics of the cured epoxy composition, such as improved dielectric constant, loss tangent, and/or water absorption.

The epoxy composition can further include any other desired additives. For example, the epoxy composition can include a filler, a plasticizing agent, a hydrophobic compounds, such as a polysiloxane or a mixture of polysiloxanes; elastomers; pigments or dyes; and/or stabilizers.

A composite for a protective cover for a transmitting/receiving device can be described by a number of different parameters, and can generally be classified into Mechanical Strength, Weatherability, and Signal Transmission Effects. The current inventors have discovered certain epoxy compositions and composite structures having such epoxy compositions that have improved, synergistic performance in combinations of mechanical strength, weatherability, and signal transmission properties.

One useful property to describe the performance of a composite in an application to protect a radio transmission/reception device is the protective cover's dielectric constant. The dielectric constant is measure of a substance's ability to insulate charges from each other. The dielectric constant described herein is a particular advantage of the composite material described herein, particularly in combination with other properties described below. The dielectric constant can be measured by ASTM D 2520 Part C.

In certain embodiments, the cured epoxy based material described herein can have a dielectric constant of no greater than 3.5, no greater than 3.4, no greater than 3.3, no greater than 3.2, no greater than 3.1, no greater than 2.999, no greater than 2.998, no greater than 2.997, no greater than 2.95, no greater than 2.93, no greater than 2.9, no greater than 2.88, or even no greater than 2.80. Further, the cured epoxy based material described herein can have a dielectric constant of at least 1, at least 2, or even at least 2.5. In very particular embodiments, the cured epoxy based material described herein can have a dielectric constant of no greater than 2.999, and even more preferably, no greater than 2.997. In particular embodiments, the cured epoxy based material described herein can have a dielectric constant in a range of any of the minimum and maximum values described above, such as in range of 1 to 2.999, 1 to 2.997, 1 to 2.93, 1 to 2.88, 2 to 2.999, 2 to 2.997, 2 to 2.93, 2 to 2.88, 2.5 to 2.999, 2.5 to 2.997, 2.5 to 2.93, or even 2.5 to 2.88.

It is to be understood that the dielectric constant can vary depending on the presence and composition of the reinforcing layer or any other additional layer described herein or otherwise traditional in the art. In particular embodiments, a composite containing quartz as described above, can have a dielectric constant of no greater than 3.29, no greater than 3.25, no greater than 3.2, or even no greater than 3.01. Further, the composite containing quartz can have any of the minimum values described above, and/or in a range of any of the minimum and maximum values described above.

One useful property to describe the performance of a composite in an application to protect a radio transmission/reception device is its water absorption. Water absorption measures the amount of water than is absorbed by the composite material. In general, it is desired to have a low water absorption as water can degrade the epoxy material and shorten its useable life. A particular advantage of the present disclosure is the achievement of the water absorption values described below, particularly in combination with other parameters described herein, such as the dielectric constant. Without wishing to be bound by theory, it was not heretofore known how to achieve the water absorption rates described herein when using less than a stoichiometric amount of an anhydride curing agent to an epoxy resin as described in detail above.

In certain embodiments, the epoxy composition described herein can have a water absorption of no greater than 5%, no greater than 4%, no greater than 3%, less than 2.5%, no greater than 2.4%, no greater than 2.3%, no greater than 2.0%, no greater than 1.8%, no greater than 1.2%, no greater than 1.1%, no greater than 1.05%, or even no greater than 1.0%. In very particular embodiments, the composite described herein can have a water absorption of less than 2.5%. Further, the epoxy composition herein can have a water absorption of at least 0.001%, at least 0.01% or even at least 0.05%. In particular embodiments, the epoxy composition described herein can have a water absorption in a range of any of the minimum and maximum values described above, such as in a range of 0.001% to 5%, 0.01% to 2.5%, 0.05% to 2.0%.

Water absorption values are represented as a percent weight gain after being subjected to a period of time in a humidity chamber. As used herein, water absorption is measured in a humidity chamber with 85% relative humidity; temperature of the chamber was set at 85 degrees Celsius for 23 hours and 25 degrees Celsius for 1 hour per day. Weight gain is measured after samples are placed in the chamber for 28 days.

Yet another useful property to describe the performance of a composite in an application to protect a radio transmission/reception device is the transmission loss of radio waves through the composite material. The radio wave transmission loss can be measured by disposing a composite between two opposed horn reflectors, transmitting a signal of certain frequency, and observing the radio wave transmission with a network analyzer as is commonly understood by one of ordinary skill in the art. As used herein, all transmission loss of radio wave measurements described herein are measured or extrapolated at 10 GHz.

In certain embodiments, the composite material described herein can have a transmission loss of no greater than 5 dB, no greater than 4 dB, no greater than 3 dB, no greater than 2 dB, no greater than 1.5 dB, no greater than 1.3 dB, no greater than 1.1 dB, no greater than 0.9 dB, no greater than 0.7 dB, no greater than 0.5 dB, or even no greater than 0.4 dB. Further, the composite material described herein can have a transmission loss of at least 0.001 dB, at least 0.01 dB, or even at least 0.05 dB. In particular embodiments, the composite material described herein can have a transmission loss in a range of any of the minimum and maximum values described above, such as in a range of 0.001 to 5 dB, 0.01 dB to 1.5 dB, or even 0.05 to 1.1 dB.

Another useful property to describe the performance of a composite in an application to protect a radio transmission/reception device is the dielectric loss tangent. Similar to dielectric constant, low loss tangents result in a "fast" substrate while large loss tangents result in a "slow" substrate. The dielectric loss tangent can be measured according to ASTM D 2520 Part C.

In certain embodiments, a cured epoxy composition described herein can have a dielectric loss tangent of no greater than 0.1, no greater than 0.01, no greater than 0.009, or even no greater than 0.0085. Further, a cured epoxy composition described herein can have a dielectric loss tangent of at least 0.00001, at least 0.0001, at least 0.001, or even at least 0.006. In particular embodiments, a cured epoxy composition described herein can have a dielectric loss tangent in a range of any of the minimum and maximum values described above, such as in range of 0.00001 to 0.1, 0.0001 to 0.01, 0.001 to 0.009, or even 0.006 to 0.0085.

Another useful property to describe the performance of a composite in an application to protect a radio transmission/reception device is the elastic modulus. The elastic modulus is a measure of the composite's elasticity. The elastic modulus can be measured by ASTM D790.

In certain embodiments, a cured epoxy composition as described herein can have an elastic modulus of no greater than 30 GPa, no greater than 25 GPa, no greater than 20 GPa, or even no greater than 16 GPa. Further, a cured epoxy composition as described herein can have an elastic modulus of at least 1 GPa, at least 5 GPa, or even at least 10 GPa. In particular embodiments, a cured epoxy composition described herein can have an elastic modulus in a range of any of the minimum and maximum values described above, such as in a range of 1 GPa to 30 GPa, 5 GPa to 25 GPa, or even 10 GPa to 16 GPa.

The epoxy composition described herein can have an advantageous gel point. The gel point represents the temperature at which the storage modulus curve, G', and loss modulus G" curve, intersect according to ASTM D 4473-03 using a parallel plate viscometer. Temperature ramp rate is set at 2 degrees Celsius per minute and an oscillation frequency at 1 Hz.

In certain embodiments, the epoxy composition described herein can have a gel point of no greater than 155 degrees Celsius, no greater than 150 degrees Celsius, no greater than 145 degrees Celsius, no greater than 143 degrees Celsius, no greater than 141 degrees Celsius, no greater than 139 degrees Celsius, no greater than 137 degrees Celsius, no greater than 135 degrees Celsius, no greater than 133 degrees Celsius, no greater than 131 degrees Celsius, no greater than 129 degrees Celsius, or even no greater than 127 degrees Celsius. In certain embodiments, the epoxy composition described herein can have a gel point of at least 100 degrees Celsius, at least 105 degrees Celsius, or even at least 110 degrees Celsius, at least 115 degrees Celsius, or even at least 120 degrees Celsius. In particular embodiments, the epoxy composition can have a cure temperature within a range of any of the minimum and maximum described above, such as in a range of 100 to 155 degrees Celsius, or even 100 to 145 degrees Celsius.

The present disclosure represents a departure from the state of the art. For example, in certain embodiments described herein, the inventors surprisingly discovered a composite construction for protecting a radio transmitter/receiver device that exhibits a synergistic combination of properties such as various combinations of dielectric constant, water absorption rate, dielectric loss tangent, elastic modulus, and others. It has heretofore been unknown how to achieve such combination of properties in a protective cover for a transmitting/receiving device. Further the use of less than a stoichiometric amount of a curing agent, such as an anhydride curing agent, to epoxy resin, and the use of the described catalyst, such as an imidazole based compound, in epoxy compositions in composites for protecting a transmitting/receiving device has never before been disclosed. Without wishing to be bound by theory, it is believed that the imidazole compound can allow for the use of less than a stoichiometric amount of the anhydride curing agent, thus promoting ether/ester crosslinkage and avoiding creation of amine and/or hydroxyl groups. It was unexpectedly discovered that such embodiments have allowed for a synergistic improvement in properties particular to composites for protecting a transmitting/receiving device such as dielectric constant, water absorption rate, dielectric loss tangent, elastic modulus, and others as discussed above.

EXAMPLES

Example 1

597 g of Epon 828 (an epoxy resin available from Momentive) was added to a 2 liter glass vessel fitted with a mixer and connected to vacuum. The vessel was heated to 135 degrees Celsius under light agitation. 149 g of Noryl SA90 (a polyphenylene oxide/polystyrene blend available from SABIC) was slowly added to the vessel, then the vessel was sealed and vacuum was applied. After 1.5 hours, Noryl was fully dissolved in Epon 828 to form an amber colored liquid. Temperature was reduced to 70 degrees Celsius. 30 g of Fortegra 100 (an epoxy toughener available from Dow Chemical) and 149 g of Methyl Nadic Anhydride was added to the vessel. Agitation continued for 10 minutes. Temperature is further cooled to 55 degrees Celsius, 75 g of 2,4 diamino-6(2'-methylimidazoleyl-(1')) ethyl-s-triazine was added to the vessel. Agitation continued for 20 minutes. Epoxy resin mixture preparation was completed.

Example 2

449 g of DER 332 (a diglycidylether of bisphenol A available from Dow Chemical) and 192 g of Epon 1001F (an epoxy resin available from Momentive) was added to a 2 liter glass vessel fitted with a mixer and connected to vacuum. The vessel was heated to 135 degrees Celsius under light agitation. 160 g of Noryl SA90 was slowly added to the vessel, then the vessel was sealed and vacuum was applied. After 1.5 hours, Noryl was fully dissolved to form an amber colored liquid. Temperature was reduced to 70 degrees Celsius. 38 g of Fortegra 100 and 80 g of tetrahydro-4-methylphthalic anhydride was added to the vessel. Agitation continued for 10 minutes. Temperature is further cooled to 55 degrees Celsius, 80 g of 2,4 diamino-6(2'-methylimidazoleyl-(1')) ethyl-s-triazine was added to the vessel. Agitation continued for 20 minutes. Epoxy resin mixture preparation was completed.

Example 3

58 g of Epon 828 was added to a glass vessel fitted with a mixer and connected to vacuum. The vessel was heated to 135 degrees Celsius under light agitation. 14.5 g of Noryl SA90 was slowly added to the vessel, then the vessel was sealed and vacuum was applied. After 1.5 hours, Noryl was fully dissolved in Epon 828 to form an amber colored liquid. Temperature was reduced to 70 degrees Celsius. 5.8 g of DER 732 and 14.5 g of Methyl Nadic Anhydride was added to the vessel. Agitation continued for 10 minutes. Temperature is further cooled to 55 degrees Celsius, 7.2 g of 2,4 diamino-6(2'-methylimidazoleyl-(1')) ethyl-s-triazine was added to the vessel. Agitation continued for 20 minutes. Epoxy resin mixture preparation was completed.

Example 4

24 g of Epon 828 was added to a glass vessel fitted with a mixer and connected to vacuum. The vessel was heated to 135 degrees Celsius under light agitation. 6 g of Noryl SA90 was slowly added to the vessel, then the vessel was sealed and vacuum was applied. After 1.5 hours, Noryl was fully dissolved in Epon 828 to form an amber colored liquid. Temperature was reduced to 55 degrees Celsius, 0.5 g of tetrahydro-4-methylphthalic anhydride and 0.45 g of 2-Ethyl-4-methylimidazole was added to the vessel. Agitation continued for 3 minutes. Epoxy resin mixture preparation was completed.

Example 5—Comparative 30 g of Epon 828 was added to a glass vessel fitted with a mixer and connected to vacuum. The vessel was heated to 135 degrees Celsius under light agitation. 30 g of Epon 1001F was slowly added to the vessel, then the vessel was sealed and vacuum was applied. After 30 minutes, became a homogenous liquid. Temperature was reduced to 60 degrees Celsius, 8.4 g of DYHARD D50EP and 0.6 g of 2,4 diamino-6(2'-methylimidazoleyl-(1')) ethyl-s-triazine was added to the vessel. Agitation continued for 20 minutes. Epoxy resin mixture preparation was completed.

Examples 6-9

Prescribed amounts, according to the table below, of DER332 (an epoxy resin available from Momentive) was added to a 2 liter glass vessel fitted with a mixer and connected to vacuum. The vessel was heated to 135 degrees Celsius under light agitation. Prescribed amount of Epon 1001F was slowly added to the vessel, then the vessel was sealed and vacuum was applied. After 15 minutes, Epon 1001F is fully dissolved. Prescribed amount of Noryl SA 90 was added to the vessel. After 1.5 hours, Noryl was fully dissolved to form an amber colored liquid. Temperature was reduced to 60 degrees Celsius. Prescribed amount of Fortegra 301, Aradur 906, DYHARD H50EP (supplied by Alzchem) and Curezol 2MZ-Azine was added to the vessel. Agitation was carried out under vacuum for 30 minutes, then cooled to room temperature. Epoxy resin composition preparation was completed.

TABLE 1

Constituents for Examples 6-9:

| Epoxy Compositions | DER 332 (g) | Epon 828 | Epon 1001F (g) | Curezol 2MZ-Azine (g) | DYHARD d50ep (g) | Aradur 906 (g) | Noryl SA90 (g) | Fortegra 301 (g) |
|---|---|---|---|---|---|---|---|---|
| Example 6 | 300 | | 300 | 36 | | | | |
| Example 7 | 300 | | 300 | 36 | | 90 | | |
| Example 8 | | 380 | | 15 | 40 | 20 | 105 | |
| Example 9 | 252 | | | 15 | 20 | 75 | 120 | 133 |

Example 10—Comparative

EXAMPLE 10 is a comparative example that was obtained from TenCate under the tradename Bryte BT250E.

To produce a sample of the cured epoxy material for evaluation of its properties, 30 g of the epoxy resin mixture from each example was transferred to a mold, and cured at 150 degrees Celsius for 4 hours to obtain an epoxy disc of about 4 mm thick.

For examples 1-3, the dielectric constant and loss tangent of the samples were measured according to ASTM D 2520 Part C at room temperature with a DI Model 400 Circular Cavity setup or using Model 03 Thin Sheet Tester and Model 900T Open Resonator, using a Hewlett-Packard 8510 vector network analyzer under the control of CAVITY™ for Macintosh OS X. The frequency of measurement was between 1.4 GHz to 25.9 GHz. Dielectric constant and loss tangent was reported as extrapolated data at 10 GHz. For examples 4-5, the dielectric constant was measured at 1 MHz.

Water Absorption was measured in a humidity chamber with 85% relative humidity; temperature of the chamber was set at 85 degrees Celsius for 23 hours and 25 degrees Celsius for 1 hour per day. Weight gain was measured after samples were placed in the chamber for 28 days.

Figure 3:
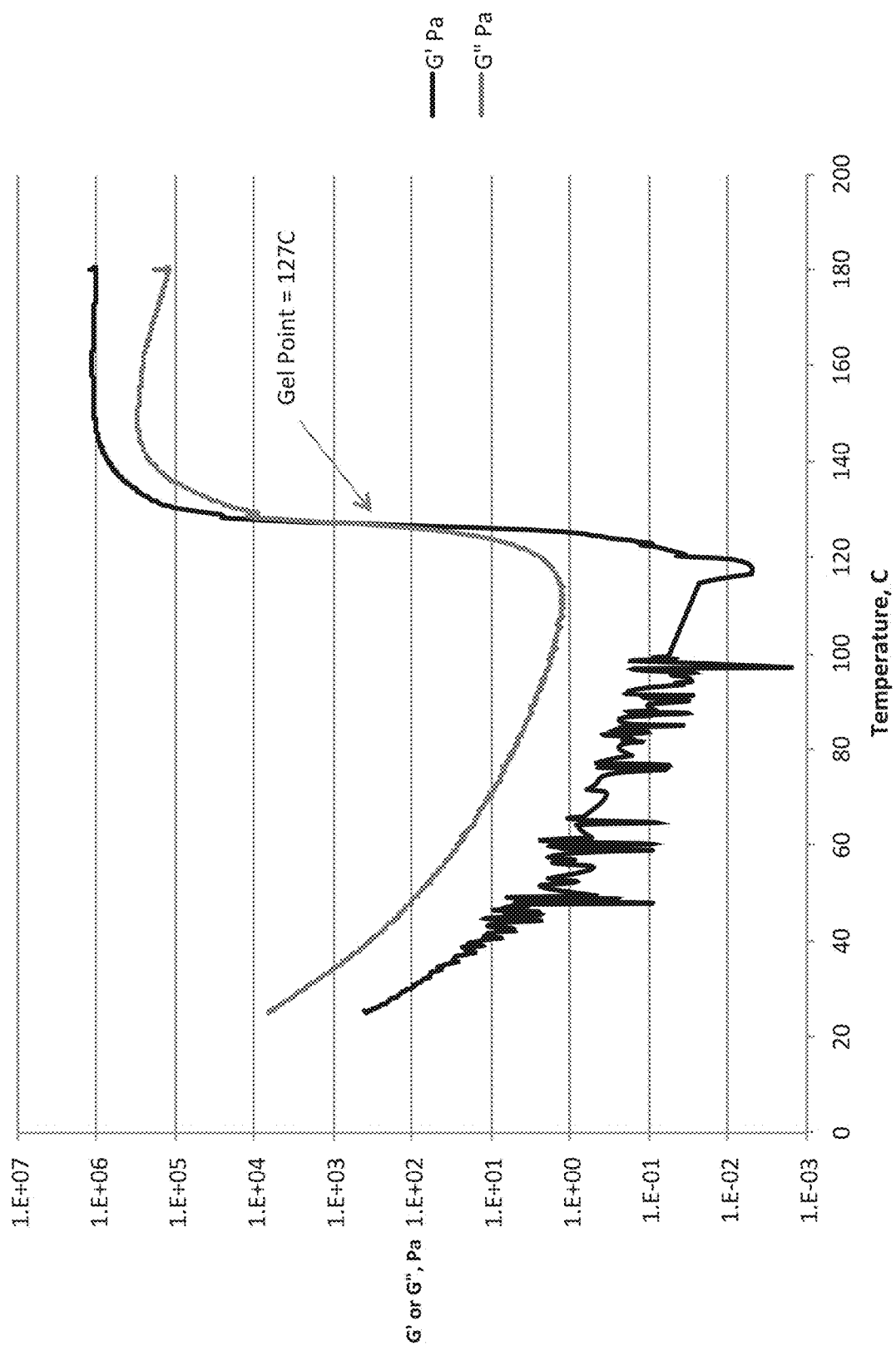
FIG. 3 includes a gel point measurement curves of an epoxy composition according to an example.
Figure 4:
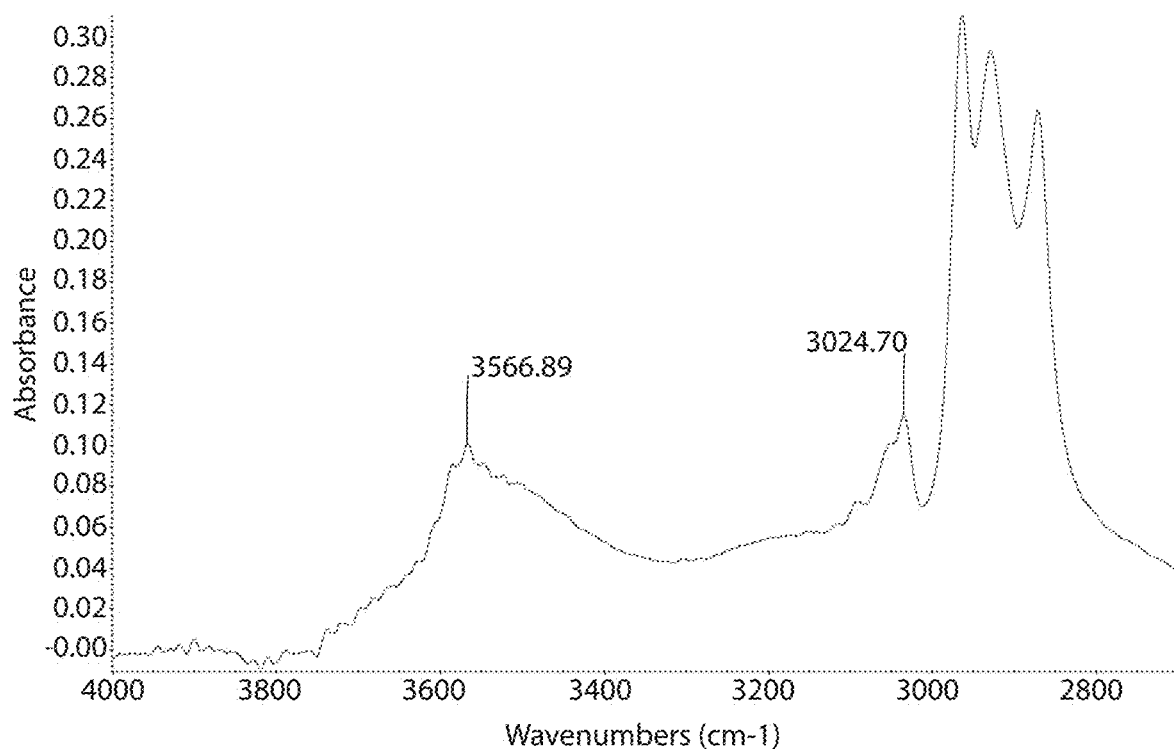
FIG. 4 includes an FTIR spectrum of a cured epoxy composition according to Example 6.
Figure 5:
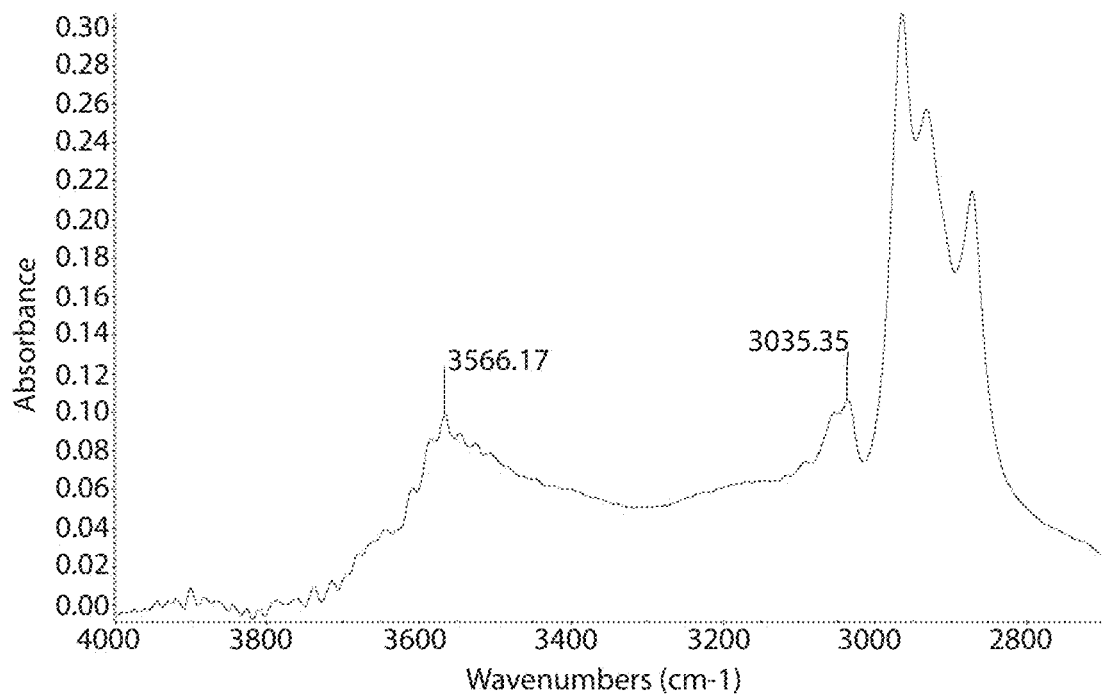
FIG. 5 includes an FTIR spectrum of a cured epoxy composition according to Example 7.
Figure 6:
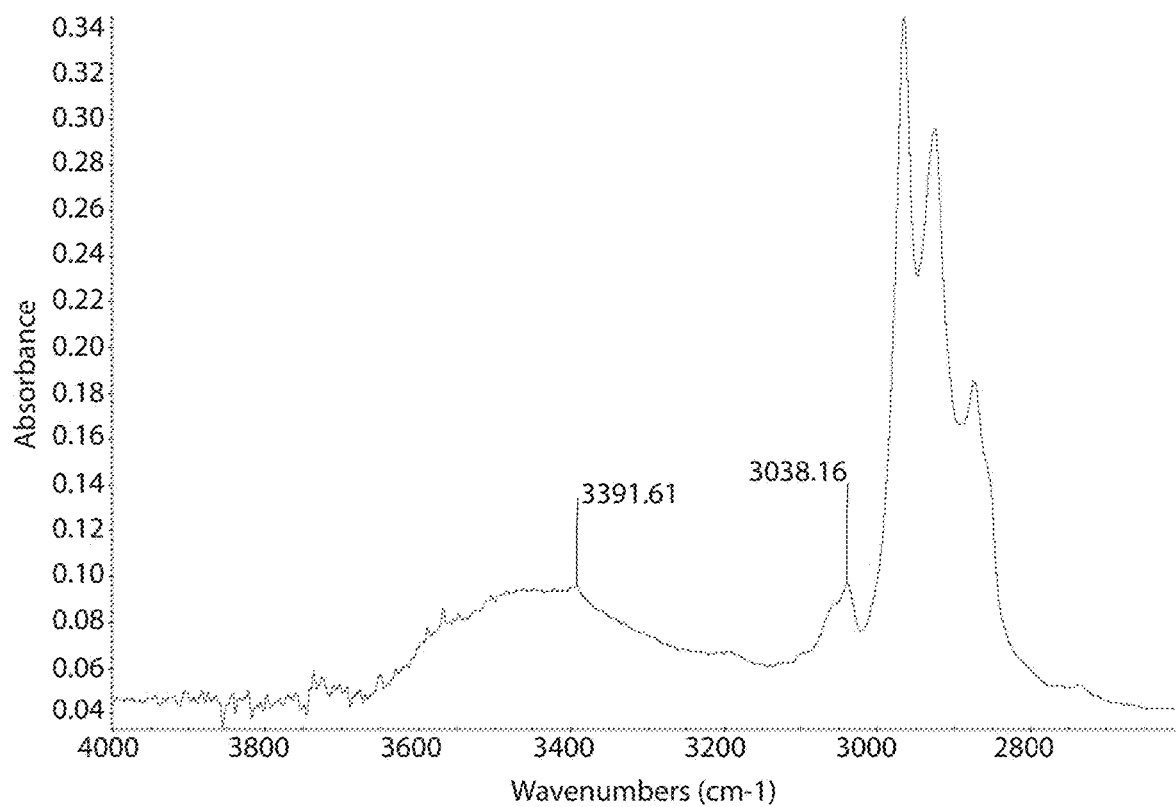
FIG. 6 includes an FTIR spectrum of a cured epoxy composition according to Example 8.
Figure 7:
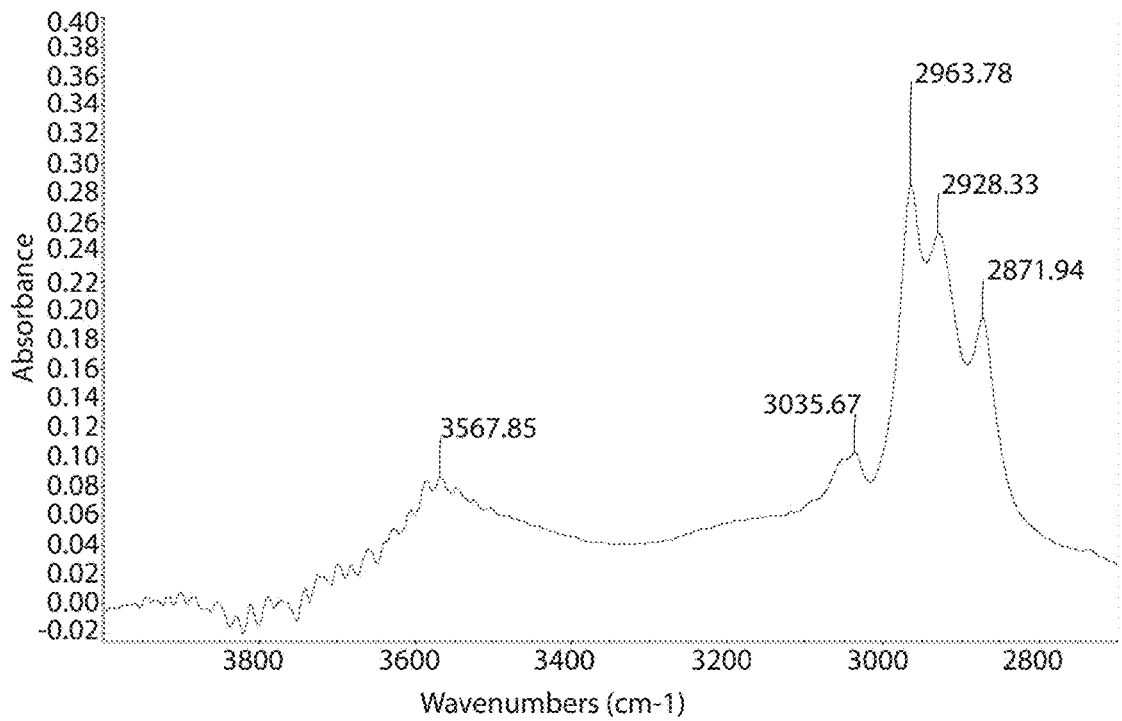
FIG. 7 includes an FTIR spectrum of a cured epoxy composition according to Example 9.
Figure 8:
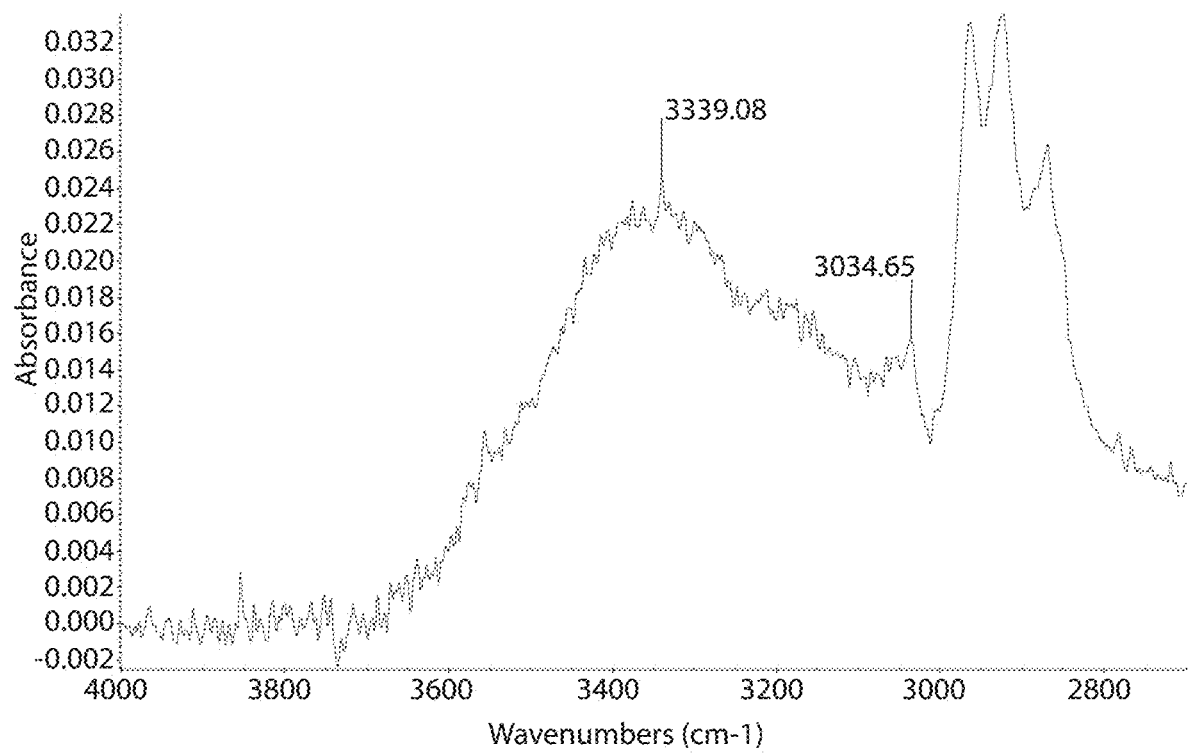
FIG. 8 includes an FTIR spectrum of a cured epoxy composition according to Comparative Example 10.

Gel Point was measured according to ASTM D 4473-03 using a parallel plate viscometer and with a temperature ramp rate of 2 degrees Celsius per minute and an oscillation frequency of 1 Hz. The storage modulus, G', and loss modulus G", curves for Example 1 and the corresponding gel point, i.e. where the two curves intersect is illustrated in FIG. 3, and shows a gel point of 127 degrees Celsius.

Examples 6-10 were also analyzed with a Thermo Nicolet iS50 FTIR Spectroscopy machine with Pike ATR-Diamond heating unit and with Thunderdome-ATR Diamond. The curing reaction of epoxy system was carried by the ATR-Diamond heating unit, while the curing process was monitored using FTIR spectrum. Operational temperature of the heated plate is from ambient to 120° C. with heating rate at 5° C./min, and then hold at this temperature for 10 minutes. After that, the plate was heated to 150° C. at 5° C./min, and hold at this temperature for 3 hours. All spectra were collected in 4000-650 cm$^{-1}$ with 32 scans at 4 cm$^{-1}$ spectral resolution. Example 10 was analyzed using Thundome-ATR-Diamond and spectra was collected in 4000-650 cm$^{-1}$ with 128 scans at 4 cm$^{-1}$ spectral resolution.

The following results were obtained

TABLE 2

| | Example 1 | Example 2 | Example 3 | Example 4 | Comparative Example 5 |
|---|---|---|---|---|---|
| Dielectric Constant | 2.90 | 2.78 | 2.87 | 2.94 | 3.32 |
| Loss Tangent | 0.020 | 0.019 | 0.019 | | |
| Water Absorption, Weight % | 1.1% | 1.1% | | | |

The FTIR spectra for each of Examples 6-9 and comparative Example 10 are illustrated in FIGS. 4-8 respectively.

The Hydroxyl (OH) group absorption in 3700-3200 cm$^{-1}$ and aromatic C—H absorption at ~3035 cm$^{-1}$ were chosen for the comparison of these cured epoxy systems. The ratio of O—H absorption peak height to aromatic C—H absorption peak height for each cured epoxy system is given in Table 3 below. The peak height measurement was conducted after ATR correction and with baseline at 3822-684 cm$^{-1}$.

TABLE 3

Ratio of OH to Aromatic CH Peak Heights

| | Example 6 | Example 7 | Example 8 | Example 9 | Comparative Example 10 |
|---|---|---|---|---|---|
| OH to Aromatic CH Peak Height Ratio | 0.89 | 0.94 | 1.02 | 0.87 | 1.59 |

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A composite for protecting a transmission/reception device, the composite comprising:

a. a reinforcing material; and b. a cured epoxy composition impregnating the reinforcing material, wherein the epoxy composition comprises an epoxy resin, and a polyphenyl ether polymer or copolymer having a number average molecular weight in a range of from 300 to 14,000.

Item 2. A composite for protecting a transmission/reception device, the composite comprising:
a. a reinforcing material; and
b. a cured epoxy composition impregnating the reinforcing material, wherein the cured epoxy composition has a dielectric constant of less than 3.0 at 10 giga hertz, and a water absorption of less than 2.0%.

Item 3. A composite for protecting a transmission/reception device, the composite comprising:
a. a reinforcing material comprising quartz; and
b. a cured epoxy composition impregnating the reinforcing material, wherein the cured epoxy composition has a dielectric constant of less than 3.3 at 10 giga hertz, and a water absorption of less than 2.0%.

Item 4. A composite for protecting a transmission/reception device, the composite comprising
a. a reinforcing material; and
b. a cured epoxy composition impregnating the reinforcing material, wherein the epoxy composition comprises reaction constituents comprising less than 50% stoichiometric amount of an anhydride curing agent to an epoxy resin.

Item 5. A composite for protecting a transmission/reception device, the composite comprising
a. a reinforcing material; and
b. a cured epoxy composition impregnating the reinforcing material, wherein the epoxy composition comprises reaction constituents comprising less than 50% stoichiometric amount of an anhydride curing agent to an epoxy resin, and wherein the reaction constituents further comprises an imidazole based compound.

Item 6. A composite for protecting a transmission/reception device, the composite comprising
a. a reinforcing material; and
b. a cured epoxy composition impregnating the reinforcing material, wherein the epoxy composition comprises reaction constituents comprising an epoxy resin and a catalyst adapted to promote ether crosslinkage, wherein the epoxy composition contains a range of 0.02 to 0.12 mole of catalyst adapted to promote ether crosslinkage per epoxy equivalent mole.

Item 7. An epoxy composition comprising:
a. an epoxy resin;
b. an anhydride curing agent; and
c. an imidazole derivative.

Item 8. An epoxy composition comprising:
a. an epoxy resin;
b. an anhydride curing agent;
c. an imidazole derivative; and
d. a poly phenyl oxide.

Item 9. A cured epoxy composition for protecting a transmission/reception device, wherein the cured epoxy composition comprises an ester crosslinkage of at least 50%.

Item 10. A cured epoxy composition comprising an epoxy resin and a catalyst adapted to promote ether crosslinkage, wherein the epoxy composition contains a range of 0.02 to 0.12 mole of catalyst adapted to promote ether crosslinkage per epoxy equivalent mole.

Item 11. A cured epoxy composition comprising an epoxy resin and a catalyst, wherein the epoxy composition has a OH to Aromatic CH peak height ratio of no greater than 1.58 as measured according to attenuated total reflectance FTIR spectroscopy (ATR-FTIR).

Item 12. A method of forming a composite comprising: providing an epoxy composition, wherein the epoxy composition comprises reaction constituents comprising less than 50% stoichiometric amount of an anhydride curing agent to an epoxy resin;
impregnating a reinforcement material with the epoxy composition; and curing the impregnated reinforcement material.

Item 13. The composition, composite, or method of any one of the preceding items, wherein the cured epoxy composition comprises ether crosslinkage.

Item 14. The composition, composite, or method of any one of the preceding items, wherein the cured epoxy composition comprises at least 30%, at least 40%, at least 50%, at least 60%, or even at least 70% ether crosslinkage, based on the total amount of crosslinkage.

Item 15. The composition, composite, or method of any one of the preceding items, wherein the cured epoxy composition comprises no greater than 100%, no greater than 99%, no greater than 95%, or even no greater than 90% ether crosslinkage based on the total amount of crosslinkage.

Item 16. The composition, composite, or method of any one of the preceding items, wherein the cured epoxy composition comprises an amount of ether crosslinkage in a range of 30% to 100%, 50% to 99%, or even 60% to 95%, based on the total amount of crosslinkage.

Item 17. The composition, composite, or method of any one of the preceding items, wherein the cured epoxy composition comprises contain ester crosslinkage.

Item 18. The composition, composite, or method of any one of the preceding items, wherein the cured epoxy composition comprises at least 1%, at least 5%, at least 8%, at least 10%, or even at least 15% ester crosslinkage, based on the total amount of crosslinkage.

Item 19. The composition, composite, or method of any one of the preceding items, wherein the cured epoxy composition comprises no greater than 75%, no greater than 50%, no greater than 40%, or even no greater than 30% ester crosslinkage based on the total amount of crosslinkage.

Item 20. The composition, composite, or method of any one of the preceding items, wherein the cured epoxy composition comprises an amount of ester crosslinkage in a range of 1% to 75%, 5% to 50%, or even 10% to 40%, based on the total amount of crosslinkage.

Item 21. The composition, composite, or method of any one of the preceding items, wherein the cured epoxy composition comprises both ether and ester crosslinkage.

Item 22. The composition, composite, or method of any one of the preceding items, wherein the cured epoxy composition comprises little to no amine crosslinkage.

Item 23. The composition, composite, or method of any one of the preceding items, wherein the cured epoxy composition comprises no greater than 10%, no greater than 5%, no greater than 3%, no greater than 2%, no greater than 1%, or even essentially free of amine crosslinkage.

Item 24. The composition, composite, or method of any one of the preceding items, wherein the cured epoxy composition comprises little to no hydroxyl crosslinkage.

Item 25. The composition, composite, or method of any one of the preceding items, wherein the cured epoxy composition comprises no greater than 10%, no greater than 5%, no greater than 3%, no greater than 2%, no greater than 1%, or even essentially free of hydroxyl crosslinkage.

Item 26. The composition, composite, or method of any one of the preceding items, wherein the epoxy composition comprises an epoxy comprising a diglycidylether of bisphenol-a.

Item 27. The composition, composite, or method of any one of the preceding items, wherein the epoxy composition comprises the epoxy resin in an amount of at least 40 wt. %, at least 50 wt. %, or even at least 60 wt. %, based on the total weight of the epoxy composition.

Item 28. The composition, composite, or method of any one of the preceding items, wherein the epoxy composition comprises a epoxy resin in an amount of no greater than 90 wt. %, no greater than 80 wt. %, or even no greater than 75 wt. %, based on the total weight of the epoxy composition.

Item 29. The composition, composite, or method of any one of the preceding items, wherein the epoxy composition comprises a epoxy resin in an amount in a range of 40 wt. % to 90 wt. %, 50 wt. %, to 80 wt. %, or even 60 wt. % to 75 wt. %, based on the total weight of the epoxy composition.

Item 30. The composition, composite, or method of any one of the preceding items, wherein the epoxy composition comprises a phenyl ether polymer.

Item 31. The composition, composite, or method of any one of the preceding items, wherein the epoxy composition comprises a polyphenylene oxide oligomer.

Item 32. The composition, composite, or method of any one of the preceding items, wherein the epoxy composition comprises a polyphenylene oxide oligomer in an amount of at least 0.1 wt. %, at least 1 wt. %, or even at least 3 wt. %, based on the total weight of the epoxy composition.

Item 33. The composition, composite, or method of any one of the preceding items, wherein the epoxy composition comprises a polyphenylene oxide oligomer in an amount of no greater than 50 wt. %, no greater than 42 wt. %, or even no greater than 35 wt. %, based on the total weight of the epoxy composition.

Item 34. The composition, composite, or method of any one of the preceding items, wherein the epoxy composition comprises a polyphenylene oxide oligomer in an amount in a range of 0.1 wt. % to 50 wt. %, 1 wt. % to 42 wt. %, or even 3 wt. % to 35 wt. %, based on the total weight of the epoxy composition.

Item 35. The composition, composite, or method of any one of the preceding items, wherein the epoxy composition comprises a polyphenylene ether or polyphenylene ether copolymer having a number average molecular weight of no greater than 15,000, no greater than 13,000, no greater than 12,000, no greater than 11,000, no greater than 10,000, no greater than 9,000, no greater than 8,000, no greater than 7,000, no greater than 6,000, or even no greater than 5,000.

Item 36. The composition, composite, or method of any one of the preceding items, wherein the epoxy composition comprises a polyphenylene ether or polyphenylene ether copolymer having a number average molecular weight of at least 300, at least 500, or even at least 800.

Item 37. The composition, composite, or method of any one of the preceding items, wherein the epoxy composition comprises a polyphenylene ether or polyphenylene ether copolymer having a number average molecular weight in a range of 300 to 15,000, 500 to 13,000, or even 800 to 10,000.

Item 38. The composition of any one of the preceding items, wherein the epoxy composition comprises a polyphenylene ether or polyphenylene ether copolymer having a terminal group which is reactive with the epoxy resin.

Item 39. The composite or method of any one of the preceding items, wherein the epoxy layer comprises a polyphenylene ether or polyphenylene ether copolymer having a terminal group which has been reacted with the epoxy resin.

Item 40. The composition of any one of the preceding items, wherein the epoxy composition comprises a polyphenylene ether or polyphenylene ether copolymer having a terminal group which is non-reactive with the epoxy resin.

Item 41. The composite or method of any one of the preceding items, wherein the epoxy layer comprises a polyphenylene ether or polyphenylene ether copolymer having a terminal group which is unreacted with the epoxy resin.

Item 42. The composition, composite, or method of any one of the preceding items, wherein the epoxy composition comprises a curing agent.

Item 43. The composition, composite, or method of any one of the preceding items, wherein the epoxy composition comprises a curing agent, and wherein the curing agent is present in the epoxy composition in less than a stoichiometric amount based on the epoxy.

Item 44. The composition, composite, or method of any one of the preceding items, wherein the epoxy composition further comprises a curing agent, and wherein the curing agent is present in the epoxy composition in less than 60%, less than 50%, less than 40%, less than 30%, less than 20%, or even less than 10% of the stoichiometric amount based on the epoxy resin.

Item 45. The composition, composite, or method of any one of the preceding items, wherein the epoxy composition further comprises a curing agent, and wherein the curing agent is present in the epoxy composition in at least 1%, at least 5%, at least 10%, or even at least 20% of the stoichiometric amount based on the epoxy resin.

Item 46. The composition, composite, or method of any one of the preceding items, wherein the epoxy composition further comprises a curing agent, and wherein the curing agent is present in the epoxy composition in a range of from 1% to 50% or even from 5% to 40% of a stoichiometric amount based on the epoxy resin.

Item 47. The composition, composite, or method of any one of the preceding items, wherein the epoxy composition further comprises a curing agent in an amount of at least 0.01 wt. %, at least 1 wt. %, at least 5 wt. %, at least 7 wt. %, or even at least 10 wt. %, based on the total weight of the epoxy composition.

Item 48. The composition, composite, or method of any one of the preceding items, wherein the epoxy composition further comprises a curing agent in an amount of no greater than 50 wt. %, no greater than 45 wt. %, or even no greater than 40 wt. %, based on the total weight of the epoxy composition.

Item 49. The composition, composite, or method of any one of the preceding items, wherein the epoxy composition further comprises a curing agent in an amount in a range of 0.01 wt. % to 50 wt. %, 1 wt. % to 50 wt. %, or even 7 wt. % to 50 wt. %, based on the total weight of the epoxy composition.

Item 50. The composition, composite, or method of any one of the preceding items, wherein the epoxy composition comprises an anhydride curing agent, a substituted guanine compound, or combinations thereof.

Item 51. The composition, composite, or method of any one of the preceding items, wherein the epoxy composition comprises an anhydride curing agent.

Item 52. The composition, composite, or method of any one of the preceding items, wherein the epoxy composition further comprises an anhydride curing agent comprising maleic anhydride, Nadic methyl anhydride, hexahydrophthalic anhydride, trimellitic anhydride, dodecenyl succinic anhydride, phthalic anhydride, methyl hexahydrophthalic anhydride, tetrahydrophthalic anhydride, methyl tetrahydrophthalic anhydride, or combinations thereof.

Item 53. The composition, composite, or method of any one of the preceding items, wherein the epoxy composition further comprises a catalyst.

Item 54. The composition, composite, or method of any one of the preceding items, wherein the epoxy composition comprises a curing agent comprising a substituted guanidine compound.

Item 55. The composition, composite, or method of any one of the preceding items, wherein the epoxy composition comprises a curing agent comprising a substituted guanidine compound comprising methyl-guanidine, dimethylguanidine, trimethylguanidine, tetra-methylguanidine, methylisobiguanidine, dimethylisobiguanidine, tetramethyliso-biguanidine, hexamethylisobiguanidine, heptamethylisobiguanidine, cyanoguanidine (dicyandiamide), or combinations thereof.

Item 56. The composition, composite, or method of any one of the preceding items, wherein the epoxy composition comprises a curing agent comprising a substituted guanidine compound comprising cyanoguanidine (dicyandiamide).

Item 57. The composition, composite, or method of any one of the preceding items, wherein the epoxy composition further comprises a catalyst adapted to promote ether crosslinkage as a primary crosslink pathway.

Item 58. The composition, composite, or method of any one of the preceding items, wherein the epoxy composition further comprises a catalyst adapted to promote ester crosslinkage as a secondary crosslink pathway.

Item 59. The composition, composite, or method of any one of the preceding items, wherein the epoxy composition further comprises a catalyst comprising an imidazole based compound, a boron halide compound or complex, or combinations thereof.

Item 60. The composition, composite, or method of any one of the preceding items, wherein the epoxy composition further comprises a catalyst comprising boron trichloride, boron trifluoride, boron trichloride amine complex, or combinations thereof.

Item 61. The composition, composite, or method of any one of the preceding items, wherein the epoxy composition further comprises a catalyst comprising an imidazole based compound.

Item 62. The composition, composite, or method of any one of the preceding items, wherein the epoxy composition further comprises a 2,4 substituted imidazole based compound.

Item 63. The composition, composite, or method of any one of the preceding items, wherein the epoxy composition further comprises an imidazole based compound in an amount of at least 0.01 wt. %, at least 0.05 wt. %, or even at least 0.2 wt. %, based on the total weight of the epoxy composition.

Item 64. The composition, composite, or method of any one of the preceding items, wherein the epoxy composition further comprises an imidazole based compound in an amount of no greater than 25%, no greater than 20%, or even no greater than 15%, based on the total weight of the epoxy composition.

Item 65. The composition, composite, or method of any one of the preceding items, wherein the epoxy composition further comprises an imidazole based compound in an amount in a range of 0.01 wt. % to 25 wt. %, 0.05 wt. % to 20 wt. %, or even 0.2 wt. % to 15 wt. %, based on the total weight of the epoxy composition.

Item 66. The composite or method of any one of the preceding items, wherein the composite further comprises a reinforcing layer.

Item 67. The composite or method of any one of the preceding items, wherein the composite further comprises a reinforcing layer comprising quartz.

Item 68. The composite or method of any one of the preceding items, wherein the reinforcing layer comprises fibers.

Item 69. The composite or method of any one of the preceding items, wherein the reinforcing layer comprises a fabric.

Item 70. The composite or method of any one of the preceding items, wherein the reinforcing layer comprises a woven material, non-woven material, spunbond material, meltspun material, or combinations thereof.

Item 71. The composite or method of any one of the preceding items, wherein the reinforcing layer comprises a woven fabric.

Item 72. The composite or method of any one of the preceding items, wherein the reinforcing layer comprises a yarn constructed of fiberglass, nylon, polyester, aramid, polyethylene, polyolefins, polyimides, carbon, polybenzimidazole (PBI), polybenzoxazole (PBO), fluorocarbon, or combinations thereof.

Item 73. The composite or method of any one of the preceding items, wherein the reinforcing layer comprises twisted yarn.

Item 74. The composite or method of any one of the preceding items, wherein the composite comprises a plurality of reinforcing layers.

Item 75. The composite or method of any one of the preceding items, wherein the composite comprises at least 3 reinforcing layers.

Item 76. The composition, composite, or method of any one of the preceding items, wherein the cured epoxy composition has a dielectric constant of no greater than 3.5, no greater than 3.4, no greater than 3.3, no greater than 3.2, no greater than 3.1, no greater than 2.999, no greater than 2.998, no greater than 2.997, no greater than 2.95, no greater than 2.93, no greater than 2.9, no greater than 2.88, or even no greater than 2.80 as measured according to ASTM D 2520 Part C.

Item 77. The composition, composite, or method of any one of the preceding items, wherein the cured epoxy composition has a dielectric constant of at least 1, at least 2, or even at least 2.5 as measured according to ASTM D 2520 Part C.

Item 78. The composition, composite, or method of any one of the preceding items, wherein the cured epoxy composition has a dielectric constant in a range of 1 to 2.999, 1 to 2.997, 1 to 2.93, 1 to 2.88, 2 to 2.999, 2 to 2.997, 2 to 2.93, 2 to 2.88, 2.5 to 2.999, 2.5 to 2.997, 2.5 to 2.93, 2.5 to 2.88 as measured according to ASTM D 2520 Part C.

Item 79. The composition, composite, or method of any one of the preceding items, wherein the reinforcing layer comprises quartz, and wherein the composite has a dielectric constant of no greater than 3.29 as measured according to ASTM D 2520 Part C.

Item 80. The composition, composite, or method of any one of the preceding items, wherein the composite has a dielectric constant of no greater than 2.999 as measured according to ASTM D 2520 Part C.

Item 81. The composition, composite, or method of any one of the preceding items, wherein the cured epoxy composition has a water absorption of no greater than 5%, no greater than 4%, no greater than 3%, less than 2.5%, no greater than 2.4%, no greater than 2.3%, no greater than 2.0%, no greater than 1.8%, no greater than 1.2%, no greater than 1.1%, no greater than 1.05%, or even no greater than 1.0% as measured at 95 GHz in a humidity chamber with 85% relative humidity, wherein a temperature of the chamber is set at 85 degrees Celsius for 23 hours and 25 degrees Celsius for 1 hour per day, and wherein weight gain was measured after samples were placed in the chamber for 28 days.

Item 82. The composition, composite, or method of any one of the preceding items, wherein the cured epoxy composition has a water absorption of less than 2.5% as measured at 95 GHz in a humidity chamber with 85% relative humidity, wherein a temperature of the chamber is set at 85 degrees Celsius for 23 hours and 25 degrees Celsius for 1 hour per day, and wherein weight gain was measured after samples were placed in the chamber for 28 days.

Item 83. The composition, composite, or method of any one of the preceding items, wherein the cured epoxy composition has a water absorption of at least 0.001%, at least 0.01% or even at least 0.05% as at 95 GHz in a humidity chamber with 85% relative humidity, wherein a temperature of the chamber is set at 85 degrees Celsius for 23 hours and 25 degrees Celsius for 1 hour per day, and wherein weight gain was measured after samples were placed in the chamber for 28 days.

Item 84. The composition, composite, or method of any one of the preceding items, wherein the cured epoxy composition has a water absorption in a range of 0.001% to 5%, 0.01% to 2.5%, 0.05% to 2.0% as measured at 95 GHz in a humidity chamber with 85% relative humidity, wherein a temperature of the chamber is set at 85 degrees Celsius for 23 hours and 25 degrees Celsius for 1 hour per day, and wherein weight gain was measured after samples were placed in the chamber for 28 days.

Item 85. The composition, composite, or method of any one of the preceding items, wherein the composite has transmission loss of no greater than 5 dB, no greater than 4 dB, no greater than 3 dB, no greater than 2 dB, no greater than 1.5 dB, no greater than 1.3 dB, no greater than 1.1 dB, no greater than 0.9 dB, no greater than 0.7 dB, no greater than 0.5 dB, or even no greater than 0.4 dB.

Item 86. The composition, composite, or method of any one of the preceding items, wherein the composite has a transmission loss of at least 0.001 dB, at least 0.01 dB, or even at least 0.05 dB.

Item 87. The composite of any one of the preceding items, wherein the composite has a transmission loss in a range of 0.001 to 5 dB, 0.01 dB to 1.5 dB, or even 0.05 to 1.1 dB.

Item 88. The composition, composite, or method of any one of the preceding items, wherein the epoxy composition has a dielectric loss tangent of no greater than 0.1, no greater than 0.01, or even no greater than 0.009, or even no greater than 0.0085 as measured according to ASTM D 2520 Part C.

Item 89. The composition, composite, or method of any one of the preceding items, wherein the epoxy composition has a dielectric loss tangent of at least 0.00001, at least 0.0001, at least 0.001, or even at least 0.006 as measured according to ASTM D 2520 Part C.

Item 90. The composition, composite, or method of any one of the preceding items, wherein the epoxy composition has a dielectric loss tangent in a range of 0.00001 to 0.1, 0.0001 to 0.01, 0.001 to 0.009, or even 0.006 to 0.0085 as measured according to ASTM D 2520 Part C.

Item 91. The composition, composite, or method of any one of the preceding items, wherein the epoxy composition has an elastic modulus of no greater than 30 GPa, no greater than 25 GPa, no greater than 20 GPa, or even no greater than 16 GPa.

Item 92. The composition, composite, or method of any one of the preceding items, wherein the epoxy composition an elastic modulus of at least 1 GPa, at least 5 GPa, or even at least 10 GPa.

Item 93. The composition, composite, or method of any one of the preceding items, wherein the epoxy composition an elastic modulus in a range of 1 GPa to 30 GPa, 5 GPa to 25 GPa, or even 10 GPa to 16 GPa.

Item 94. The composition, composite, or method of any one of the preceding items, wherein the epoxy composition has a gel point temperature of no greater than 155 degrees Celsius, no greater than 150 degrees Celsius, no greater than 145 degrees Celsius, no greater than 143 degrees Celsius, no greater than 141 degrees Celsius, no greater than 139 degrees Celsius, no greater than 137 degrees Celsius, no greater than 135 degrees Celsius, no greater than 133 degrees Celsius, no greater than 131 degrees Celsius, no greater than 129 degrees Celsius, or even no greater than 127 degrees Celsius as measured according to a Gel point test under ASTM 4473-03.

Item 95. The composition, composite, or method of any one of the preceding items, wherein the epoxy composition has a gel point temperature of at least 100 degrees Celsius, at least 105 degrees Celsius, or even at least 110 degrees Celsius, at least 115 degrees Celsius, or even at least 120 degrees Celsius as measured according to a Gel point test under ASTM 4473-03.

Item 96. The composition, composite, or method of any one of the preceding items, wherein the epoxy composition has a gel point temperature in a range of 100 to 155 degrees Celsius, or even 100 to 145 degrees Celsius as measured according to a Gel point test under ASTM 4473-03.

Item 97. The composition, composite, or method of any one of the preceding items, wherein the composite is rigid.

Item 98. The composition, composite, or method of any one of the preceding items, wherein the composite is adapted to allow passage of a radio signal through the composite.

Item 99. The composition, composite, or method of any one of the preceding items, wherein the epoxy layer comprises a reactive phosphorus containing compound.

Item 100. The composition, composite, or method of any one of the preceding items, wherein the epoxy layer comprises hollow glass spheres.

Item 101. The composition, composite, or method of any one of the preceding items, wherein the epoxy layer comprises a reactive phosphorus containing compound, a toughening agent, hollow glass spheres, or combinations thereof.

Item 102. The composition, composite, or method of any one of the preceding items, wherein the epoxy composition comprises an epoxy resin and a catalyst adapted to promote ether crosslinkage, wherein the epoxy composition comprises at least 0.001, at least 0.005, at least 0.01, at least 0.015, at least 0.018, at least 0.020, or even at least 0.025 mole of catalyst adapted to promote ether crosslinkage per epoxy equivalent mole, when fully reacted.

Item 103. The composition, composite, or method of any one of the preceding items, wherein the epoxy composition comprises an epoxy resin and a catalyst adapted to promote ether crosslinkage, wherein the epoxy composition comprises no greater than 0.5, no greater than 0.4, no greater than 0.3, no greater than 0.2, no greater than 0.18, no greater than 0.16, no greater than 0.14, or even no greater than 0.12 mole of catalyst adapted to promote ether crosslinkage per epoxy equivalent mole, when fully reacted.

Item 104. The composition, composite, or method of any one of the preceding items, wherein the epoxy composition comprises an epoxy resin and a catalyst adapted to promote ether/ester crosslinkage, wherein the epoxy composition comprises a range of 0.005 to 0.3, or even 0.02 to 0.12 mole of catalyst adapted to promote ether crosslinkage per epoxy equivalent mole, when fully reacted.

Item 105. The composition, composite, or method of any one of the preceding items, wherein the epoxy composition has a OH to Aromatic CH peak height ratio of no greater than 1.58, no greater than 1.5, no greater than 1.4, no greater than 1.3, no greater than 1.2, no greater than 1.1, or even no greater than 1.0 as measured according to attenuated total reflectance FTIR spectroscopy (ATR-FITR).

Item 106. The composition, composite, or method of any one of the preceding items, wherein the epoxy composition has a OH to Aromatic CH peak height ratio of at least 0.1, at least 0.2, or even at least 0.3 as measured according to attenuated total reflectance FTIR spectroscopy (ATR-FITR).

Item 107. The composition, composite, or method of any one of the preceding items, wherein the epoxy composition has a OH to Aromatic CH peak height ratio in a range of from 0.1 to 1.59, 0.1 to 1.5, 0.2 to 1.4, or even 0.3 to 1.3 as measured according to attenuated total reflectance FTIR spectroscopy (ATR-FITR).

Item 108. A protective cover for a device for transmitting and/or receiving radio signals, wherein the protective cover comprises the composite of any one of the preceding items.

Item 109. The protective cover of item 92, wherein the protective cover comprises a continuous sheet of the composite.

Item 110. A nose cone of an airplane comprising the composite or protective cover of any one of the preceding items.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite for protecting a transmission/reception device, the composite comprising:
    a reinforcing material; and
    a cured epoxy composition impregnating the reinforcing material,
    wherein the epoxy composition comprises:
        an epoxy resin,
        a polyphenyl ether polymer or copolymer having a number average molecular weight in a range of from 300 to 14,000, and
        an anhydride curing agent,
        wherein the epoxy resin is present in the epoxy composition in a range of 50 wt. % to 80 wt. % based on the total weight of the epoxy composition,
        wherein the polyphenyl ether polymer is present in the epoxy composition in a range of 1 wt. % to 42 wt. % based on the total weight of the epoxy composition,
        wherein the curing agent is present in the epoxy composition in a range of 5% to 40% of the stoichiometric amount based on the epoxy resin, and
        wherein the cured epoxy composition has a dielectric constant of less than 3.0 at 10 giga hertz, and a water absorption of less than 2.0%.

2. The composite of claim 1, wherein the cured epoxy composition comprises a polyphenylene ether or polyphenylene ether copolymer having a number average molecular weight of no greater than 10,000.

3. The composite of claim 1, wherein the cured epoxy composition comprises a polyphenylene ether or polyphenylene ether copolymer having a number average molecular weight of no greater than 5,000.

4. The composite of claim 1, wherein the cured epoxy composition comprises a polyphenylene ether or polyphenylene ether copolymer having a terminal group which is covalently bonded with the epoxy resin.

5. The composite of claim 1, wherein the cured epoxy composition comprises a polyphenylene ether or polyphenylene ether copolymer having a terminal group which is not covalently bonded with the epoxy resin.

6. The composite of claim 1, wherein the cured epoxy composition comprises an amount of ether crosslinkage in a range of 50% to 95%, based on the total amount of crosslinkage; and wherein the cured epoxy composition comprises an amount of ester crosslinkage in a range of 5% to 50% based on the total amount of crosslinkage.

7. The composite of claim 1, wherein the cured epoxy composition has a ratio of no greater than 5% of amine groups to total crosslinkages; and no greater than 5% of hydroxyl groups to total crosslinkages.

8. The composite of claim 1, wherein the epoxy composition further comprises a catalyst comprising an imidazole based compound or a boron halide compound.

9. The composite of claim 1, wherein the cured epoxy composition has a OH to aromatic CH peak height ratio in a range of from 0.1 to 1.5 as measured according to attenuated total reflectance FTIR spectroscopy.

10. The composite of claim 1, wherein the cured epoxy composition has a water absorption in a range of 0.01% to 2.5% as measured at 95 GHz in a humidity chamber with 85% relative humidity, wherein a temperature of the chamber is set at 85 degrees Celsius for 23 hours and 25 degrees Celsius for 1 hour per day, and wherein weight gain was measured after samples were placed in the chamber for 28 days.

11. The composite of claim 1, wherein the composite has a transmission loss in a range of 0.01 dB to 1.5 dB.

12. The composite of claim 1, wherein the epoxy composition has a dielectric loss tangent in a range of 0.0001 to 0.01 as measured according to ASTM D 2520 Part C.

13. The composite of claim 1, wherein the epoxy composition has a gel point temperature in a range of 100 to 155 degrees Celsius as measured according to a Gel point test under ASTM 4473-03.

14. A protective cover for a device for transmitting and/or receiving radio signals, wherein the protective cover comprises the composite of claim 1.

15. A nose cone of an airplane comprising the composite the composite of claim 1.

16. A composite comprising
a reinforcing material; and
a cured epoxy composition impregnating the reinforcing material,
wherein the cured epoxy composition is the reaction product of constituents comprising an epoxy resin, a polyphenyl ether polymer or copolymer, a catalyst, and a curing agent,
wherein the epoxy resin is present in the epoxy composition in a range of 50 wt. % to 80 wt. % based on the total weight of the epoxy composition,
wherein the polyphenyl ether polymer is present in the epoxy composition in a range of 1 wt. % to 42 wt. % based on the total weight of the epoxy composition, and
wherein the curing agent consists of an anhydride curing agent and wherein the curing agent is present in the cured epoxy composition in less than 40% of the stoichiometric amount based on the epoxy resin.

17. An epoxy composition adapted to form a subcomponent of a composite for protecting a device for transmitting or receiving radio signals, the epoxy composition comprising:
an epoxy resin;
a anhydride curing agent;
an imidazole derivative; and
a poly phenyl oxide having a number average molecular weight in a range of from 300 to 14,000;
wherein the epoxy resin is present in the epoxy composition in a range of 50 wt. % to 80 wt. % based on the total weight of the epoxy composition,
wherein the poly phenyl oxide is present in the epoxy composition in a range of 1 wt. % to 42 wt. % based on the total weight of the epoxy composition
wherein the curing agent is present in the cured epoxy composition in less than 40% of the stoichiometric amount based on the epoxy resin.

* * * * *